United States Patent
Arcella et al.

(10) Patent No.: US 6,726,840 B1
(45) Date of Patent: Apr. 27, 2004

(54) MEMBRANES OF (PER)FLUORINATED AMORPHOUS POLYMERS

(75) Inventors: Vincenzo Arcella, Milan (IT); Amalia Gordano, Cosenza (IT); Patrizia Maccone, Milan (IT); Enrico Drioli, Naples (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/576,992

(22) Filed: May 24, 2000

(30) Foreign Application Priority Data

May 25, 1999 (IT) .......................... MI99A1153

(51) Int. Cl.[7] .............................. B01D 39/14
(52) U.S. Cl. ........................... 210/500.28; 210/500.27; 210/500.34; 264/41
(58) Field of Search ............... 210/500.27, 500.28, 210/500.36, 500.22; 264/41

(56) References Cited

U.S. PATENT DOCUMENTS

| | | | |
|---|---|---|---|
| 2,242,218 A | | 5/1941 | Auer |
| 3,665,041 A | | 5/1972 | Sianesi et al. |
| 3,715,378 A | | 2/1973 | Sianesi et al. |
| 3,962,153 A | * | 6/1976 | Gore |
| 4,910,276 A | | 3/1990 | Nakamura et al. |
| 4,935,477 A | * | 6/1990 | Squire |
| 4,948,851 A | | 8/1990 | Squire |
| 4,954,271 A | | 9/1990 | Green |
| 5,032,274 A | | 7/1991 | Yen et al. |
| 5,051,114 A | * | 9/1991 | Nemser et al. |
| 5,489,406 A | | 2/1996 | Beck et al. |
| 5,914,154 A | * | 6/1999 | Nemser |
| 6,579,341 B2 | * | 6/2003 | Baker et al. |

FOREIGN PATENT DOCUMENTS

| | | |
|---|---|---|
| EP | 0 148 482 A2 | 7/1985 |
| EP | 0 239 123 A2 | 9/1987 |
| EP | 0 416 528 A2 | 3/1991 |
| EP | 0 633 256 A1 | 1/1995 |
| EP | 0 633 257 B1 | 1/1995 |
| EP | 0 683 181 B1 | 11/1995 |
| WO | WO 95/26218 | 10/1995 |
| WO | WO 97/35905 | 10/1997 |

OTHER PUBLICATIONS

Italian Patent Application No. M98A 001506, Jun. 30, 1998.

* cited by examiner

Primary Examiner—Ana Fortuna
(74) Attorney, Agent, or Firm—Arent Fox Kintner Plotkin Kahn

(57) ABSTRACT

Porous membranes of (per)fluorinated amorphous polymers having a porosity in the range 5–500 nm, preferably 20–100 nm, measured by an atomic force electronic microscope; the membrane pore average size distribution being narrow, about 80%–90% of the pores have a size ranging from minus 5 nm to plus 5 nm of the value of the distribution maximum peak.

22 Claims, No Drawings

MEMBRANES OF (PER)FLUORINATED AMORPHOUS POLYMERS

FIELD OF THE INVENTION

The present invention relates to porous membranes of amorphous fluoropolymers for separation processes.

Specifically, the invention relates to membranes having improved porosity, in the range 5–500 nm, derived from amorphous (per)fluorinated polymeric films having a flat or cylindrical shape, and usable in separation processes such as ultrafiltration and nanofiltration, in particular of non-aqueous solutions of organic solvents containing a solute, for example a dissolved polymer. Another use is in the contactor field wherein an aqueous liquid phase containing a dissolved gas, for example $O_2$ or $CO_2$, is contacted with the membrane, through which the gas permeation takes place allowing the control of the gas concentration in the liquid phase.

BACKGROUND OF THE INVENTION

The preparation of films and dense non-porous membranes of amorphous fluoropolymers obtained by dissolving an amorphous fluoropolymer in a solvent, filtering the solution and then using the spin coating method to coat glass substrata having a low thickness, is known in the prior art. This procedure is described in European Patent 416,528, wherein as fluoropolymer an amorphous perfluorinated copolymer formed of perfluoro-2,2-dimethyl-1,3-dioxole (PDD) in an amount between 30% and 99% by moles and of tetrafluoroethylene (TFE), is used. The obtained films have a substantially uniform thickness in the range 0.3–20 $\mu$m.

Dense membranes of this type have a chemical-structural porosity, pore size of about some Angstrom (about 10). See W. J. Davies and R. A. Pethrick, Eur. Polym. J. 30 (1994) 1289. These membranes can be used for the separation of a gas from a liquid. The productivity is rather good as regards the gas passing through the membrane. However, for the membranes to be used in ultrafiltration processes or for contactors, an even improved productivity is desirable.

U.S. Pat. No. 4,948,851 describes articles obtained by the same amorphous perfluorinated copolymers of EP '528, specifically self-supported films having a thickness of about 100–400 $\mu$m, prepared by molding of the melted amorphous polymer. With these copolymers it is possible to prepare self-supported films by casting having a thickness of the order of 20–25 $\mu$m. The obtained films are dense and do not show porosity as above said, therefore they have the drawbacks mentioned in EP '528.

U.S. Pat. No. 5,051,114 describes films obtained by deposition from casting having a thickness of the order of 25 $\mu$m. Such films can be used supported on porous substrata to form composite membranes useful for enriching and/or separating gaseous mixtures. In this patent, selectivity values for the couple $O_2/N_2$ from 2.0 to 2.4 are reported, depending on the dioxole PDD content in the PDD/TFE copolymer. It is shown that by increasing the dioxole content, the oxygen permeability increases but the selectivity decreases. Further data relating to the selectivity to gases are given in Chapter 22 of "Modem Fluoropolymers" (1997) by P. R. Resnick and W. H. Buck, wherein in the case of membranes of copolymers PDD/TFE in molar ratio 87:13 obtained from casting, a value of 5.0 for the couple $CO_2/N_2$ and 4.4 for the couple $H_2/N_2$ is mentioned. The membranes described in this patent, even though they have a good gas-permeability, have no porosity and therefore they have the drawbacks mentioned in EP '528.

In European Patent Publication 969,025 in the name of the Applicant the preparation of non-porous manufactured articles of amorphous fluoropolymers formed of a copolymer of 2,2,4-trifluoro-5-trifluoromethoxy-1,3-dioxoles (TTD) with tetrafluorotilene, is described. The obtained membranes are dense and asymmetric and have selectivity towards gases, optionally used on supports suitable for obtaining composite membranes. In order to obtain said membranes under the form of flat dense films the solution is deposited on a smooth flat support with a stratifying knife and the solvent is eliminated by thermal treatment at high temperature, as mentioned in said patent. Tests carried out by the Applicant have shown that in order to obtain said selective membranes, thermal treatments at a temperature close to the boiling point of the used solvent and a subsequent treatment at a temperature near the amorphous polymer Tg, are used. In order to achieve the asymmetric membranes the phase inversion technique is used. According to this technique, after the solution deposition the support coated by the polymer is dipped into a coagulation bath maintained at a predefined temperature and formed of a non-solvent, preferably n-pentane. Such membranes show an improved selectivity in the gaseous separation, but since they have the layer effective to permeation with porosity of chemical-structural type (some Angstrom), they are not very suitable to be used as contactor membranes, for example for the control of the gas concentration in a liquid. Therefore, these membranes also show the drawbacks mentioned above.

Polytetrafluoroethylene (PTFE) porous films (of the order of thousands of Angstrom) are commercially known, obtained by a complex lubricated extrusion process at a high temperature, wherein the film porosity is induced by a complex stretching mechanical treatment of the extruded film. Films of this kind are known for example by GORE-TEX®. The membranes obtained from these products are used for ultrafiltration processes. The drawback of these membranes is that they are obtained with an expensive and complex process from the processing point of view.

The need was therefore felt to have available films of (per)fluorinated amorphous polymers characterized by an improved porosity and obtainable by a cheap industrial process, without using the complex thermomechanical treatments used for the porous films based on foam PTFE available on the market.

SUMMARY OF THE INVENTION

The present invention provides porous membranes of (per)fluorinated amorphous polymers having a porosity in the range of 5–500 nm, preferably 20–100 nm, measured by an atomic force electronic microscope. With respect to the membrane pore average size, about 80%–90% of the pores have a size ranging from minimum 5 nm to plus 5 nm of the value of the distribution peak. The porous membranes are suitable for use in separation processes such as ultrafiltration or nanofiltration as well as in the contactor field.

DETAILED DESCRIPTION OF THE INVENTION

The Applicant has surprisingly found that it is possible to obtain films and porous membranes of (per)fluorinated amorphous polymers suitable for ultrafiltration, nanofiltration processes and in the contactor field, not showing the prior art drawbacks.

An object of the invention is porous membranes of (per)fluorinated amorphous polymers having a porosity in the range 5–500 nm, preferably 20–100 nm, determined by an atomic force electronic microscope (FEM).

The membrane pore average size distribution of the (per)fluorinated amorphous polymers of the invention is very narrow, about 80%–90% of the pores have a size ranging from minus 5 nm to plus 5 nm of the value of the distribution maximum peak. Generally, the pore distributions are monodispersed for 80–90% close to the maximum peak value. For example, for a membrane having the distribution maximum peak close to about 60 nm, the pore sizes are for about 80–90% in the range 55–65 nm.

The pore number for mm$^2$ in correspondence of the distribution maximum peak ranges for example from about 20 to 150.

The porous membranes of (per)fluorinated amorphous polymers of the present invention are obtainable from copolymers of the following monomers:

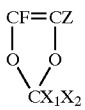 (I)

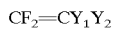 (II)

wherein: Z is selected from F, $R_f$, $OR_f$, preferably $OR_f$; $R_f$ is a perfluoroalkyl radical $C_1$–$C_5$; $X_1$ and $X_2$ are selected from F and $CF_3$; $Y_1$ and $Y_2$ are selected from F, Cl, $CF_3$, $OR_f$, preferably F.

Also homopolymers of the monomers of structure (I) are usable.

Other amorphous (per)fluorinated polymers which can be used are those obtained from the cyclopolymerization of monomers having structure (II) with bisvinyloxymethanes having structure (III):

 (III)

wherein $X^1$ and $X^2$, equal to or different from each other, are F, Cl, preferably F; $X^3$ and $X^4$, equal to or different from each other, are F or $CF_3$. The copolymers of monomer (II) with monomers (III) show cyclic repeating units in the backbone. Said copolymers are described in EP 683,181 in the name of the Applicant, herein incorporated by reference. Also homopolymers of the monomers of structure (III) are usable.

Alternatively, other amorphous (per)fluorinated polymers which can be used in the present invention are those obtained by the cyclopolymerization of monomers having structure (II) with dienes having structure (IV):

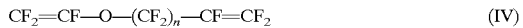 (IV)

wherein n=1–5, preferably 1–2.

Also, in this case copolymers showing cyclic repeating units are obtained. Also, homopolymers of the monomers of structure (IV) are usable. Said polymers are described in U.S. Pat. No. 4,910,276.

Also amorphous copolymers of the monomers having structure (I) and/or (III) and/or (IV) can be used.

The amount of one or more comonomers having structure (I), (III), (IV), is to be such to bring to amorphous (per) fluorinated polymers. Those of ordinary skill in the field are able to easily determine the amount of such comonomers.

The copolymers obtained from the structures (I) and (II) wherein Z=$OR_f$ with $R_f$=$CF_3$, $X_1$,$X_2$,$Y_1$,$Y_2$=F, are particularly preferred for the present invention results. The dioxole percentage having structure (I) is generally in the range 40%–90% by moles, preferably 50%–85% by moles.

The dioxole class having structure (I) preferably used in the present invention is mentioned in EP 633,256; still more preferably 2,2,4-trifluoro-5-trifluoromethoxy-1,3-dioxole (TTD) is used.

The compounds having structure (II) used in the polymerization are tetrafluoroethylene, perfluoroalkylvinylethers ($C_1$–$C_5$), hexafluoropropene, chlorotrifluoroethylene, preferably tetrafluoroethylene (TFE) is used.

The films and membranes of the (per)fluorinated amorphous polymers are obtainable by a casting process comprising dissolving a copolymer derived from the above-mentioned structures in a fluorinated solvent and effecting the solvent evaporation under specific operating conditions.

Specifically, the process for preparing the porous membranes of the present invention comprises the preparation at room temperature, generally in the range 15° C.–25° C., of a solution of the amorphous polymer in a fluorinated solvent; the solution viscosity at 23° C. being in the range 5–5,000 cP (centipoise), preferably 10–300 cP; then the solution is spread on an inert support, preferably by a stratifying knife having a defined thickness; it is allowed to evaporate at a constant temperature, preferably equal to the spreading one, lower than 10° C.–45° C. with respect to the solvent boiling temperature, preferably lower than 20° C.–35° C., for a sufficient time to allow a slow solvent evaporation and the consequent formation inside the film of pores having the above-mentioned sizes; said time being in the range of about 1–10 days, preferably 3–6 days.

The fluorinated solvent has generally a boiling temperature in the range 50° C.–300° C., preferably 50° C.–150° C., still more preferably 50° C.–80° C.

Preferred conditions to carry out the invention process are those wherein the polymeric solution spreading and the solvent evaporation are carried out at a temperature in the range 10° C.–40° C. and using a dihydrofluoropolyether solvent as defined hereunder having a boiling temperature in the range 55° C.–60° C.

Generally, the polymer concentration in the solution is in the range 1–20% by weight, preferably 1–10% by weight.

With the invention process porous membranes are surprisingly and unexpectedly obtained, whose porosity ranges from 5 to 500 nm and depends on the selected operating conditions. Such porosity is remarkably higher than the porosity of the prior art perfluorinated dense membranes, which only have a porosity of chemical-structural type, with pore size of about some Angstrom (about 10, see the comparative Examples).

Without being bound to any theory, the Applicant maintains that the different pore sizes depend on various parameters, such as the solution vapour pressure at the spreading temperature and at the subsequent evaporation temperature, the polymer concentration in the solution which determines the casting solution viscosity.

As fluorinated solvents for the present invention casting process, (per)fluoropolyethers (Galden®, Fomblin®, Krytox®, Demnum®), dihydrofluoropolyethers (H-Galden®), fluorinated and perfluorinated ethers Fluorinert® (series FC and HFE) optionally containing one or more hydrogen atoms in the end groups, perfluoroalkanes, optionally containing nitrogen and/or oxygen atoms instead of one or more carbon atoms in the backbone, can be used. Generally, all the solvents having a solubility parameter similar to that of the used amorphous polymer, are suitable.

The above-mentioned (per)fluoropolyethers comprise one or more of the following units, statistically distributed along the chain, selected from: $(C_3F_6O)$, $(C_2F_4O)$, $(CFXO)$ wherein X is equal to F or $CF_3$, $(CR_1R_2CF_2CF_2O)$ wherein $R_1$ equal to or different from $R_2$ is H, F, perfluoroalkyl $C_1$–$C_3$.

In particular, (per)fluoropolyethers containing the following units can be mentioned:

a) $-O(C_3F_6O)_{m'}(CFXO)_{n'}-$ wherein the units $(C_3F_6O)$ and (CFXO) are perfluorooxyalkylene units statistically distributed along the chain; m' and n' are integers such as to give products having boiling point generally in the range 60° C.–300° C., preferably 60° C.–150° C., and m'/n' is in the range 5–40, when n' is different from 0; X is equal to F or $CF_3$; n' can also be 0;

b) $-O(C_2F_4O)_{p'}(CFXO)_{q'}-(C_3F_6O)_{t'}-$ wherein p', q' and t' are integers such as to give products having the boiling point mentioned in a), p'/q' ranges from 5 to 0.3, preferably from 2.7 to 0.5; t' can be 0 and q'/(q'+p'+t') lower than or equal to 1/10 and the t'/p' ratio is from 0.2 to 6;

c) $-(CR_1R_2CF_2CF_2O)_n-$ wherein $R_1$, $R_2$, equal to or different from each other are H, F, perfluoroalkyl $C_1$–$C_3$; n is an integer such as to give products having the boiling point mentioned in a).

The (per)fluoropolyether end groups are selected from $-CF_3$, $-C_2F_5$, $-C_3F_7$, optionally containing one or two chlorine atoms, $-CF_2H$, $-CFHCF_3$.

The indicated fluoropolyethers are obtainable with the well known processes in the prior art, for example U.S. Pat. No. 3,665,041, U.S. Pat. No. 2,242,218, U.S. Pat. No. 3,715,378, U.S. Pat. No. 4,954,271 and European patents EP 239,123, EP 148,482, WO 95/26218.

The hydrofluoropolyethers contain as end groups one or two end groups selected from $-CF_2H$, $-CFHCF_3$. The boiling points for the solvents having hydrogenated end groups are preferably in the range 50° C.–250° C., still more preferably 50° C.–150° C.

Preferably, in order to obtain the porous membranes of the present invention for the casting process as a solvent a dihydrofluoropolyether type b) is used, wherein t' is equal to 0, X=F or $CF_3$ and both the end groups are $-CF_2H$. Preferably the boiling point is between 50° C. and 80° C.

As a support for the polymer film spreading, glass/quartz, polymethylmethacrylate, polycarbonate, polyurethane, polystyrene, ceramic and metal supports, thermoplastic fluoropolymers, preferably glass and polyurethane, can for example be used.

The porous membranes of the present invention amorphous polymers can be used in separation processes such as ultrafiltration and nanofiltration, in particular of non-aqueous solutions of organic solvents containing a solute, for example a dissolved polymer.

Due to the characteristics of high chemical resistance and hydrophobicity due to the (per)fluorinated structure of the amorphous polymer of the invention, said membranes can be used as contactor membranes having a high productivity. As application of contactor membranes, purification of a fluid containing gaseous impurities put into contact with the side of a membrane, which can be in the supported or self-supported form, can be mentioned. For example, in the semiconductor industry, contactor membranes can be used for obtaining ultrapure water free from dissolved gases. The gases to be eliminated, differently from the liquid, pass through the membrane allowing a purified liquid to be obtained. Due to the polymer high chemical resistance the invention membranes can be used with aggressive liquids and/or gases.

Finally the porous membranes of the invention represent an alternative to the foam PTFE films used in multilayer textiles, known by GORETEX®, but obtainable with a simplified process from the industrial point of view.

The present invention will now be better illustrated by the following examples, which have a merely indicative purpose and not limitative of the scope of the invention itself.

EXAMPLES

Example 1

The copolymer used in this Example, formed of 60% by moles of 2,2,4-trifluoro-5-trifluoromethoxy-1,3-dioxole (TTD) and of 40% by moles of TFE, is prepared according to EP 633,257.

A solution of the above-mentioned copolymer is prepared at room temperature in a hydrofluoropolyether solvent of type b) wherein t' is equal to 0, X=F and both end groups are $-CF_2H$ and having a boiling point of 55° C. (Galden® HT55). The solution having a polymer concentration equal to 10% by weight, is stirred for 2 days at room temperature, and is prepared by using a jar-rotor. The solution viscosity is 100 cP.

Then the polymeric film spreading is carried out on a glass sheet by operating at a temperature of 13° C. using a stratifying knife Braive Instruments, whose thickness is fixed at 250 $\mu$m.

The solution is then allowed to evaporate for four days at a constant temperature of 13° C.

A symmetric membrane having a porous structure with pore average size equal to 34 nm is obtained. The pore distribution comprises values ranging from about 20 to 60 $\mu$m, about 90% of the pores have sizes in the range 30–38 nm. The pore number per $mm^2$ having a 34 nm size is about 20. The obtained membrane thickness is about 15 $\mu$m.

The pore size and number per $mm^2$ are determined by an atomic force electronic microscope.

Such membrane is characterized by permeability tests to separated gaseous flows of $O_2$, $N_2$, $CO_2$. The gas pressure is 5 $Kg/cm^2$.

The gas-permeability has been determined by thermostated volumetric cell at the temperature of 25° C. and is expressed in Barrer:

1 Barrer=$(10^{-10}$ $cm^3$×cm)/($cm^2$×cmHg×sec)

The permeability value in the various tests is reported in Table 2. The data in the Table show that the invention membrane gives high permeability values and has no selectivity Example 2

Example 1 was repeated but carrying out the polymeric film spreading on a glass sheet at a temperature of 24° C. using a stratifying knife Braive Instruments, whose thickness is fixed at 250 $\mu$m.

The solution is then allowed to evaporate for four days at a constant temperature of 24° C.

A symmetric membrane having a porous structure with pore average size equal to 40 nm is obtained. The pore distribution comprises values ranging from about 25 to 50 nm, about 90% of the pores have sizes in the range 38–42 nm. The pore number per $mm^2$ having a 40 nm size is about 90. The obtained membrane thickness is about 15 $\mu$m.

Such membrane is characterized by permeability tests to separated gaseous flows of $O_2$, $N_2$, $CO_2$.

The gas-permeability has been determined by thermostated volumetric cell at the temperature of 25° C.

The permeability value in the various cases is reported in Table 2. The data in the Table show that the invention membrane gives high permeability values and has no selectivity.

Example 3

Example 1 was repeated but carrying out the polymeric film spreading on a glass sheet at a temperature of 36° C. using a stratifying knife Braive Instruments, whose thickness is fixed at 250 μm.

The solution is then allowed to evaporate for four days at a constant temperature of 36° C.

A symmetric membrane having a porous structure with pore average size equal to 59 nm is obtained. The pore distribution comprises values ranging from about 40 to 100 nm, about 90% of the pores have sizes in the range 55–64 nm. The pore number per mm² having a 59 nm size is about 120 and represents 80% of the total of the pores. The obtained membrane thickness is about 15 μm.

Such membrane is characterized by permeability tests to separated gaseous flows of $O_2$, $N_2$, $CO_2$.

The gas-permeability has been determined by thermostated volumetric cell at the temperature of 25° C. and is reported in Table 2.

The data in the Table show that the invention membrane gives high permeability values and has no selectivity.

Example 4

The copolymer used in this Example, formed of 80% by moles of 2,2,4-trifluoro-5-trifluoromethoxy-1,3-dioxole (TTD) and of 20% by moles of TFE, is prepared according to EP 633,257.

A solution of the above-mentioned copolymer is prepared at room temperature in the perfluoropolyether solvent of Example 1. The solution having a polymer concentration equal to 10% by weight, is stirred for 2 days at room temperature, and is prepared by using a jar-rotor. The solution viscosity is 80 cP.

Then the polymeric film spreading is carried out on a glass sheet operating at a temperature of 18° C. using a stratifying knife Braive Instruments, whose thickness is fixed at 250 μm.

The solution is then allowed to evaporate for four days at a constant temperature of 18° C. A symmetric membrane having a porous structure with pore average size equal to 36 nm is obtained. The obtained membrane thickness is about 15 μm.

Such membrane is characterized by permeability tests to separated gaseous flows of $O_2$, $N_2$, $CO_2$.

The permeability values in the various cases are reported in Table 2. The data in the Table show that the invention membrane gives high permeability values and has no selectivity.

Example 5 (comparative)

A solution of the copolymer of Example 1 is prepared, formed of 60% of TTD and of 40% by moles of TFE, in a Galden® solvent HT55. The copolymer concentration is equal to 10% by weight. The solution viscosity is 100 cP.

The solution is deposited at room temperature on a glass support by the stratifying knife of Example 1 having a defined thickness equal to 250 μm. Then the support with the just deposited polymer is dipped in a coagulation bath formed of n-pentane at a temperature of 20° C., obtained by cooling the coagulation bath with ice. In this way, an asymmetric membrane is obtained according to the phase inversion technique described in European Patent Publication 969,025. The thickness of the obtained membrane is about 20 μm.

The obtained membrane is characterized by permeability tests to separated gaseous flows of $O_2$, $N_2$, $CO_2$. The data reported in Table 2 show that the membrane has a porosity of structural type, indeed the pore average sizes are of about 5 Å (0.5 nm). Furthermore, the membrane of this Example is selective towards different gases. Furthermore, from the data it results that the permeability is remarkably lower in comparison with the ones of the membranes of the invention.

In Table 1 the operating conditions of Examples 1–5 are reported and in Table 2 the gas-permeability values of the various Examples.

TABLE 1

| Example | TTD % moles | Solvent | Polymer Concentr. % by wt. | Operating Temperature (° C.) |
|---------|-------------|---------|----------------------------|------------------------------|
| 1 | 60 | GALDEN ® HT55 | 10 | 13° C. |
| 2 | 60 | GALDEN ® HT55 | 10 | 24° C. |
| 3 | 60 | GALDEN ® HT55 | 10 | 36° C. |
| 4 | 80 | GALDEN ® HT55 | 10 | 18° C. |
| 5 (comp) | 60 | GALDEN ® HT55 | 10 | 20° C. |

TABLE 2

| Example | Average Porosity (nm) | Permeability (Barrier) | | | Selectivity | |
|---------|-----------------------|------|------|------|-------------|--------|
| | | $O_2$ | $N_2$ | $CO_2$ | $O_2/N_2$ | $CO_2/N_2$ |
| 1 | 34 | 1500 | 1500 | 1500 | 1 | 1 |
| 2 | 40 | 9000 | 9000 | 9000 | 1 | 1 |
| 3 | 59 | 25000 | 25000 | 25000 | 1 | 1 |
| 4 | 36 | 3500 | 3500 | 3500 | 1 | 1 |
| 5 (comp) | 0.5 | 111 | 34.1 | 269 | 3.2 | 7.9 |

What is claimed is:

1. Porous membranes of (per)fluorinated amorphous polymers having a pore size in the range 5–500 nm an average pore size distribution, determined by an atomic force electronic microscope, wherein in the pore size distribution of said membranes 80%–90% of the pores have a size ranging from minus 5 nm to plus 5 nm of the value of the pore distribution maximum peak.

2. Porous membranes of (per)fluorinated amorphous polymers according to claim 1, the (per)fluorinated polymers selected from the group consisting of A), B) and C):

A) polymers made of monomers that are selected from the group consisting of formulas (I), (II), (III) and (V):

$$CF_2=CY_1CY_2 \qquad (II)$$

wherein: $Y_1$ and $Y_2$ are selected from F, Cl, $CF_3$, $OR_f$ wherein $R_f$ is a $C_1$–$C_5$ perfluoroalkyl radical;

dioxoles having structure (I):

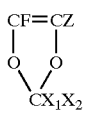

(I)

wherein: Z is selected from F, $R_f$, $OR_f$; $R_f$ is a perfluoroalkyl radical $C_1$–$C_5$; $X_1$ and $X_2$ are selected from F and $CF_3$;

bisvinyloxymethanes having structure (III):

$$CFX^1=CX^2-O-CX^3X^4-O-CX^2=CX^1F \quad (III)$$

wherein $X^1$ and $X^2$, equal to or different from each other, are F, Cl; $X^3$ and $X^4$, equal to or different from each other, are F or $CF_3$;

dienes having structure (IV);

$$CF_2=CF-O-(CF_2)_n-CF=CF_2 \quad (IV)$$

wherein n=1–5;

B) homopolymers of monomers having structure (I) or (III) or (IV);

C) copolymers of monomers having structure (I) or (III) or (IV).

3. Porous membranes of (per)fluorinated amorphous polymers according to claim 2, wherein the copolymer is derived from the structures (I) and (II) wherein Z=$OR_f$ with $R_f$=$CF_3$, $X_1, X_2, Y_1, Y_2$=F.

4. Porous membranes of (per)fluorinated amorphous polymers according to claim 2, wherein the dioxole percentage having structure (I) is in the range 40%–90% by moles.

5. Porous membranes of (per)fluorinated amorphous polymers according to claim 4, wherein the dioxole percentage having structure (I) is in the range 50%–85% by moles.

6. Porous membranes of (per)fluorinated amorphous polymers according to claim 2, wherein as dioxole having structure (I) 2,2,4-trifluoro-5-trifluoromethoxy-1,3-dioxole (TTD) is used.

7. Porous membranes of (per)fluorinated amorphous polymers according to claim 2, wherein the monomers having structure (II) are selected from tetrafluoroethylene, perfluoroalkylvinylethers ($C_1$–$C_5$), hexafluoropropene, chlorotrifluoroethylene.

8. Porous membranes of (per)fluorinated amorphous polymers according to claim 7, wherein the monomers having structure (II) are tetrafluoroethylene.

9. Porous membranes of (per)fluorinated amorphous polymers according to claim 2, wherein Z is $OR_f$.

10. Porous membranes of (per)fluorinated amorphous polymers according to claim 2, wherein $X^1$ and $X^2$, equal to or different from each other, are F.

11. Porous membranes of (per)fluorinated amorphous polymers according to claim 2, the dienes having structure (IV) wherein n=1–2.

12. Process for obtaining the porous membranes of (per) fluorinated amorphous polymers according to claim 1, comprising:

the preparation at room temperature, in the range 15° C.–25° C., of a solution of the a morphous polymer in a fluorinated solvent; the solution viscosity at 23° C. being in the range 5–5,000 cP (centipoise);

the solution is spread on an inert support;

it is let evaporate at a constant temperature inferior of 10° C.–45° C. with respect to the solvent boiling temperature, for a time from about 1 to 10 days.

13. A process according to claim 12, wherein the fluorinated solvent has a boiling temperature in the range 50° C.–300° C.

14. A process according to claim 12, wherein the polymer concentration in the solution is in the range 1–20% by weight.

15. A process according to claim 12, wherein the fluorinated solvent is selected from (per)fluoropolyethers (Galden®, Fomblin®, Krytox®, Demnum®), hydrofluoropolyethers (H-Galden®), fluorinated and perfluorinated ethers Fluorinert® (series FC and HFE) optionally containing one or more hydrogen atoms in the end groups, perfluoroalkanes.

16. A process according to claim 12, wherein the fluorinated solvent is selected from (per)fluoropolyethers containing the following units:

a) —$O(C_3F_6O)_{m'}(CFXO)_{n'}$— wherein the units ($C_3F_6O$) and (CFXO) are perfluorooxyalkylene units statistically distributed along the chain; m' and n' are integers to give products having boiling point generally in the range 60° C.–300° C., and m'/n' is in the range 5–40, when n' is different from 0; X is equal to F or $CF_3$; n' can also be 0;

b) —$O(C_2F_4O)_{p'}(CFXO)_{q'}$—$(C_3F_6O)_{r'}$ wherein p', q' and t' are integers such as to give products having the boiling point mentioned in a), p'/q' ranges from 5 to 0.3; t' can be 0 and q'/(q'+p'+t') lower than or equal to 1/10 and the t'/p' ratio is from 0.2 to 6;

c) —$(CR_1R_2CF_2CF_2O)_n$— wherein $R_1$, $R_2$, equal to or different from each other are H, F, perfluoroalkyl $C_1$–$C_3$; n is an integer to give products having the boiling point mentioned in a);

the end groups are selected from —$CF_3$, —$C_2F_5$, —$C_3F_7$, optionally containing one or two chlorine atoms, —$CF_2H$, —$CFHCF_3$.

17. A process according to claim 16, wherein the fluorinated solvent is dihydrofluoropolyether of type b) wherein t' is equal to 0, X=F or $CF_3$ and both end groups are —$CF_2H$; the boiling point being in the range 50° C.–80° C.

18. A process according to claim 12, wherein the polymeric solution spreading and the solvent evaporation are carried out at a temperature between 10° C. and 40° C. and using a fluorinated solvent having a boiling temperature between 55° C. and 60° C.

19. A process according to claim 12, wherein the support for the spreading of the polymeric film is selected from: glass/quartz, polymethylmethacrylate, polycarbonate, polyurethane, polystyrene, ceramic and metal supports, thermoplastic fluoropolymers.

20. A ultrafiltration or nanofiltration separation process wherein a solution containing a solute is contacted with the porous membrane of claim 1.

21. Porous membranes of (per)fluorinated amorphous polymers according to claim 1 having a porosity in the range 20–100 nm.

22. A method for purifying a fluid containing gas impurities by contacting said fluid with the membranes of claim 1.

* * * * *